United States Patent

[11] 3,598,336

[72] Inventor George Edward Frost
Birmingham, Mich.
[21] Appl. No. 1,197
[22] Filed Jan. 7, 1970
[45] Patented Aug. 10, 1971
[73] Assignee General Motors Corporation
Detroit, Mich.

[54] SEATBELT RETRACTOR
7 Claims, 10 Drawing Figs.
[52] U.S. Cl. .................................................. 242/107.4
[51] Int. Cl. ..................................................... B65h 75/48
[50] Field of Search ........................................... 242/107 R,
107 SB, 107.4, 107.5, 107.6; 297/386, 388, 389;
280/150 SB

[56] References Cited
UNITED STATES PATENTS
| | | | |
|---|---|---|---|
| 3,193,327 | 7/1965 | Roe | 297/388 |
| 3,348,789 | 10/1967 | Hirsch | 242/107.4 |
| 3,412,952 | 11/1968 | Wohlert et al. | 242/107.4 |
| 3,446,454 | 5/1969 | Kovacs et al. | 242/107.4 |
| 3,450,368 | 6/1969 | Glauser et al. | 242/107.4 |
| 3,467,337 | 9/1969 | Putman | 242/107.4 |
| 3,471,100 | 10/1969 | Arcari | 242/107.4 |
| 3,476,333 | 11/1969 | Weman | 242/107.4 |
| 3,482,799 | 12/1969 | Wrighton et al. | 242/107.4 |

Primary Examiner—Stanley N. Gilreath
Assistant Examiner—Werner H. Schroeder
Attorneys—W. E. Finken and Herbert Furman ABSTRACT: An automatic locking seatbelt retractor includes a rotatable reel biased in a belt retracting direction and having its end plates provided by circular peripherally toothed like ratchet members engageable by a rotatable spring biased pawl to block movement of the reel in an extending direction. A rotatable cam plate frictionally driven by the reel between two limit positions includes two spaced peripheral shoulders. Each shoulder is engageable with the pawl in alternate limit positions to hold the pawl out of engagement with the teeth of the ratchet members. A pivoted blocking lever is movable between blocking and unblocking positions with respect to the pawl. A pivoted control lever is linked to the blocking lever and biased to either of two positions by an overcenter torsion spring. A reel-driven ring gear includes peripherally spaced abutments engageable with the control lever. When the reel is in a fully belt-retracted position, the cam plate is in one limit position and the blocking lever is in blocking position. One of the cam plate abutments and the blocking lever engage the pawl to hold the pawl out of engagement with the teeth of the ratchet members. When the reel is rotated in a belt-extending direction and a predetermined length of belt is extended, the cam plate is frictionally driven to the other limit position and the other abutment of the cam plate engages the pawl. An abutment of the ring gear engages and then passes the control lever to move the control lever from one position to the other and in turn move the blocking member from blocking to unblocking position. Upon slight retraction and then extension of the belt after buckled to another belt to form a belt assembly, the cam plate is rotated toward the one limit position and the other abutment of the cam plate thereupon moves out of engagement with the pawl. The pawl is then spring biased into engagement with like teeth of the ratchet members and prevents further extension of the belt. As the belt is retracted, the cam plate is moved to the one limit position and the one plate abutment engages the pawl to hold it out of engagement with the ratchet members. The one abutment of the ring gear passes the control lever, and the other abutment of the ring gear engages the control lever immediately adjacent the fully retracted position of the belt to move the control lever to the one position and move the blocking lever to blocking position.

PATENTED AUG 10 1971 3,598,336

INVENTOR
George E. Frost
BY
Herbert Furman
ATTORNEY

INVENTOR.
George E. Frost
BY
Herbert Furman
ATTORNEY

SEATBELT RETRACTOR

This invention relates to seatbelt retractors and more particularly to seatbelt retractors of the automatic locking type.

Seatbelt retractors of the automatic locking type generally include a reel mounting a belt and being spring biased in a belt-retracting direction. A ratchet and pawl arrangement permits movement of the reel in a belt-retracting direction at all times but blocks movement of the reel in an extending direction whenever the pawl engages the ratchet. A first sensor senses either the amount of belt wound on the reel or the number of rotations which the reel has made from a predetermined retracted position, and holds the pawl out of engagement with the ratchet until a certain length of belt has been extended or the reel has rotated through a certain number of revolutions to extend such length of belt. Once this length of belt has been extended, the first sensor no longer blocks movement of the pawl into engagement with the ratchet. A second rotatable sensor is frictionally driven by the reel and moves between predetermined limit positions at opposite ends of a predetermined arc of movement. The second sensor is in one limit position at one end of its arc of movement when the belt is fully retracted and cooperates with the first sensor in blocking engagement of the pawl with the ratchet.

Thus, the first and second sensors block engagement of the pawl with the ratchet when the belt is fully retracted. When a predetermined length of belt is extended and the reel is rotated in an extending direction, the first sensor no longer blocks movement of the pawl into engagement with the ratchet. The second sensor moves with the reel from the one limit position to the other so that only the second sensor blocks the pawl after the predetermined length of belt has been extended. Once the belt has been extended to whatever length is desired and buckled to another belt to form the belt assembly, the reel is slightly wound in a retracting direction and then in an extending direction. The second sensor moves with the reel from its other limit position to a position intermediate the other limit position and the one limit position to thereby release the pawl for engagement with the ratchet and block any further movement of the reel in an extending direction. Thus the belt is locked against further extension although retraction is permitted at all times.

The retractor of this invention is of the automatic locking type but includes an improved first sensor for sensing the number of revolutions of the reel an controlling the movement of the pawl into and out of engagement with the ratchet.

In the preferred embodiment of the invention the first sensor includes blocking member swingable into and out of engagement with the pawl to thereby selectively block and unblock the pawl. The blocking member is linked to a swingable control member which is resiliently biased to either of two positions. A reel-driven ring gear includes a pair of spaced peripheral abutments of different radial extent. The ring gear abutment of greater radial extent engages the control member when the reel is immediately adjacent a fully belt-retracted position to move the control member from one position to the other position and move the blocking member from unblocking to blocking position. When the reel is thereafter moved in a belt-extending direction through a predetermined number of revolutions, the other ring gear abutment of lesser radial extent engages the control member to move the control member from the other position to the one position and in turn move the blocking member to unblocking position. After the other ring gear abutment engages and moves the control member to the one position, it bypasses the control member and thereby permits full movement of the reel in a belt-extending direction. Thus, after a predetermined length of belt has been extended, only the friction-driven second sensor blocks the pawl. Thereafter the second sensor releases the pawl for engagement with the ratchet when the reel is first moved in a belt-retracting direction and then in a belt-extending direction. When the reel is thereafter moved in a belt-retracting direction, the other ring gear abutment bypasses the control member and the one ring gear abutment engages the control member when the belt is almost fully retracted to move the control member to the other position and move the blocking member to blocking position.

The primary feature of this invention is to provide an improved sensor for an automatic locking seatbelt retractor which senses the movement of the seatbelt reel in belt-extending and -retracting directions and includes control means intermittently connected to the reel and moving blocking means into and out of engagement with a pawl to thereby selectively block and unblock movement of the pawl with respect to a seatbelt reel ratchet. Another feature of this invention is that the control means includes a control member resiliently biased to either of two positions and moved between such positions by a reel-driven rotatable ring gear having spaced abutments selectively and alternately engageable with the control member. A further feature of this invention is that the spaced abutments of the ring gear are of different radial extent, the one abutment of greater extent engaging the control member immediately adjacent the fully retracted position of the belt to move the control member to a first position and move the blocking member to blocking position, and the other abutment of lesser extent engaging the control member after a predetermined length of belt has been extended to move the control member to a second position and move the blocking member to unblocking position, with the other abutment thereafter bypassing the control member during movement of the ring gear.

These and other features of the retractor of this invention will be readily apparent from the following specification and drawings wherein.

Figure 1:
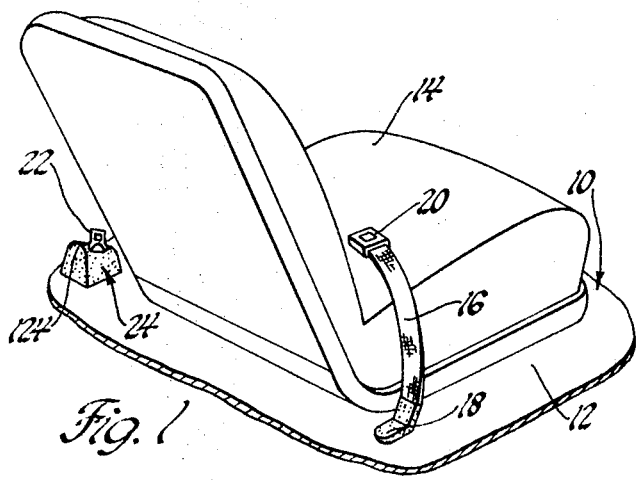
FIG. 1 is a partial perspective view of a vehicle body having a seat mounted therein and a lap belt assembly for the seat, with the outboard lap belt being mounted on the body by a retractor according to this invention and being fully retracted.

Referring now particularly to FIG. 1 of the drawings, a vehicle body designated generally 10 includes a floor pan 12 on which is conventionally mounted a conventional bucket-type vehicle seat 14 A lap belt assembly is provided for the occupant of the seat and includes an inboard belt 16 conventionally anchored at one end 18 to the floor pan 12 and provided with a conventional buckle 20 at its free end.

The outboard belt 22 is mounted on the floor pan 12 by a retractor 24 a according to this invention and includes a conventional D-ring at its free end which is cooperable with the buckle 20 when the belt 22 is extended to form a lap belt assembly for the occupant of seat 14. Since the retractor 24 is of the automatic locking type, no adjustment of either belt 16 or 22 is required for varying-size occupants.

Figure 2:
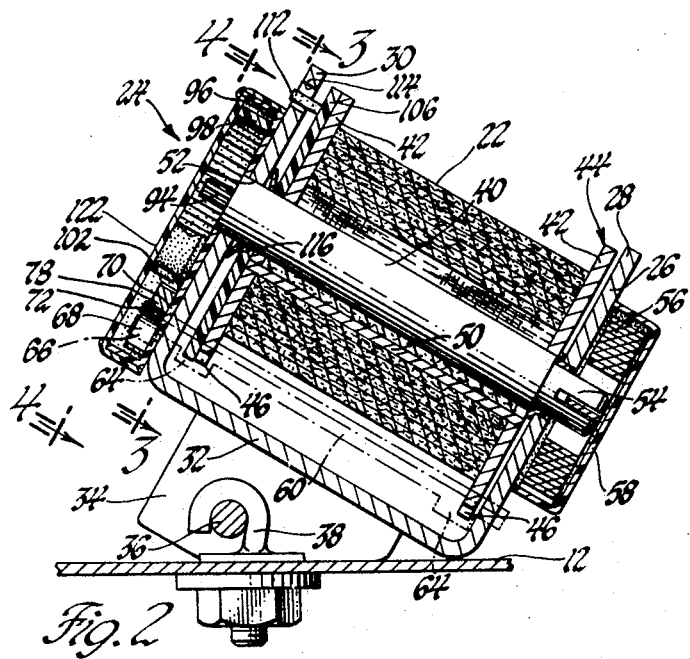
FIG. 2 is an enlarged partially broken away view of a portion of FIG. 1.
Figure 3:
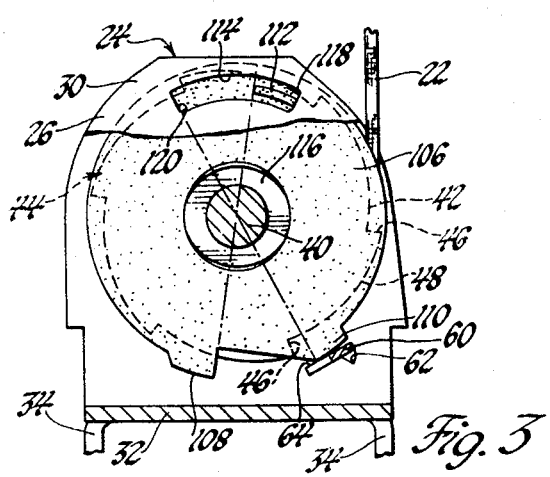
FIG. 3 is a partially broken away view taken generally along the plane indicated by line 3-3 of FIG. 2.
Figure 10:
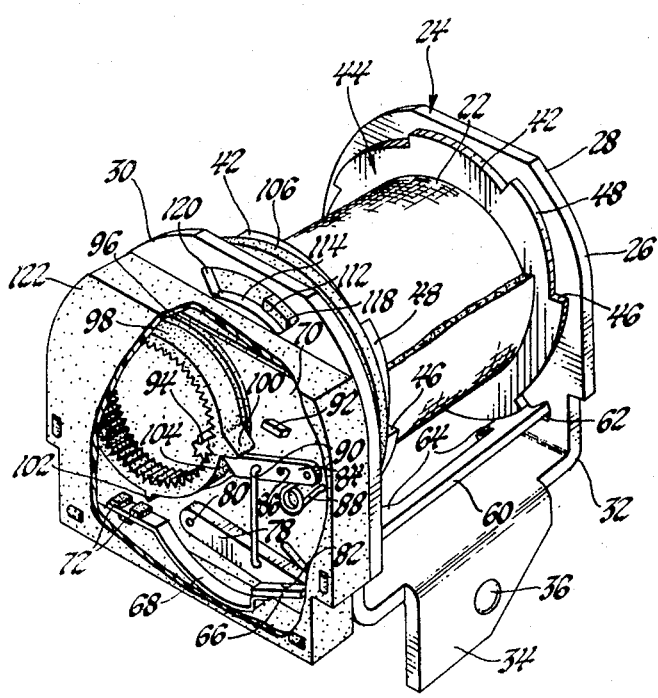
FIG. 10 is a broken away perspective view of the retractor with the belt in fully retracted position.

As best shown in FIGS. 2, 3 and 10 of the drawings, the retractor 24 includes a generally channel-shaped housing 26 having spaced end walls 28 and 30 which are interconnected by a base wall 32 provided with integral depending apertured flanges 34. The flanges 34 are interconnected by a pin 36. As shown in FIG. 2, a hook member 38 bolted to the floor pan 12 engages the pin 36 to thereby mount the housing 26 on the floor pan 12. It will be noted that the flanges 34 are partially cut away to fix the angular position of the retractor with respect to the floor pan 12 and in turn fix the belt angle when the belt 22 is extended from the retractor.

Figure 9:
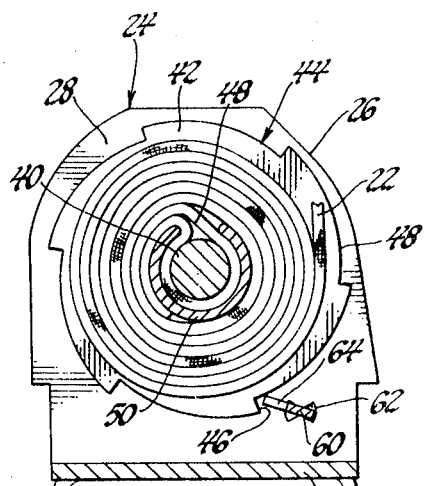
FIG. 9 is a sectional view of the retractor with a predetermined length of belt extended.

A shaft 40 extends through and is secured to like apertured ratchet plates 42 to provide a reel 44. The peripheries of the plates are provided with a number of equally spaced axially aligned radial shoulders 46. The shoulders of each plate are interconnected by cam surfaces 48. The belt 22 is fully wound on reel 44 when it is fully retracted and is unwound from the reel when it is extended, as will be further described. As best shown in FIG. 9, the looped inner end of the belt 22 receives the shaft 40 and a spring clamp 50 is fitted over the looped end of the belt to thereby secure the belt to the reel.

The reel 44 is rotatably mounted on the housing 26 by journaling one end of the shaft 40 within an aperture 52, FIG. 2, in end wall 30 and journaling the reduced diameter slotted other end 54 of the shaft within a bushed opening in the other end wall 28. A conventional clock spring 46 has its outer spiral suitably anchored to the wall 28 and its inner spiral received within the slotted end 54 of the shaft 40 to thereby continually bias the reel 44 in a clockwise direction as viewed in FIGS. 3 through 10 of the drawings or, in other words, continuously bias the reel in a belt-retracting direction. A conventional cover 58 secured to wall 28 covers the clock spring.

From the foregoing description, it can be seen that when the D-ring on the outer end of the belt 22 is manually grasped by an occupant of the seat 14 and pulled, the reel 44 will be rotated in a counterclockwise or belt-extending direction as viewed in FIGS. 3 through 10 against the action of the spring 56.

As best shown in FIG. 10, a flat pawl 60 extends between the walls 28 and 30 and is rotatably received within hourglass-shaped openings 62 in the walls. The pawl 60 includes lateral extensions 64 which extend toward the ratchet plates 42 and are engageable with any respective pair of shoulders 46 thereof to block movement of the reel 44 in a counterclockwise or belt-extending direction As best shown in FIG. 10, the pawl 60 further includes a lateral extension 66 located outboard of the wall 30. A leaf spring 68 has the free offset end thereof engaging the extension 66 to continually bias the pawl 60 clockwise and thereby bias the extensions 64 into engagement with the peripheries of the ratchet plates 42 and, of course, into engagement with the adjacent pair of shoulders 46 upon counterclockwise movement of the reel 44.

Referring now particularly to FIG. 10, a plastic plate 70 fits against the outer surface of the end wall 30 and is secured thereto in any suitable manner. Integral lateral tabs 72 of this plate engage over one end of the spring 68 to mount the spring thereon.

Figure 4:
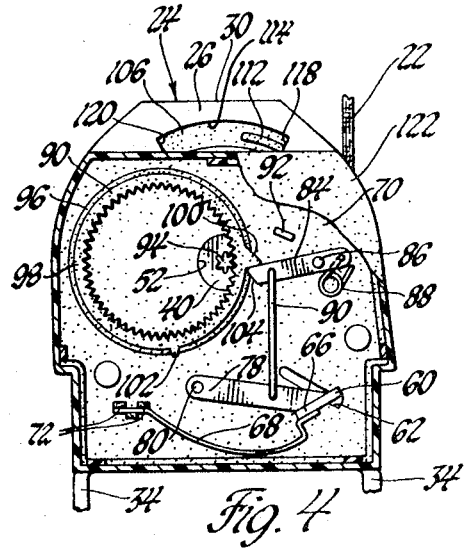
FIG. 4 is a partially broken away view taken generally along the plane indicated by line 4-4 of FIG. 2.
Figure 5:
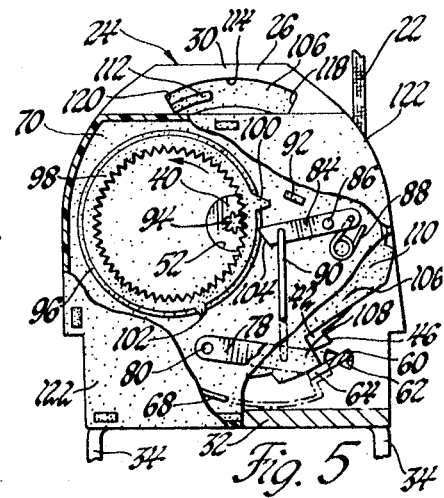
FIG. 5 is a view similar to FIG. 4 and showing the belt partially extended.
Figure 6:
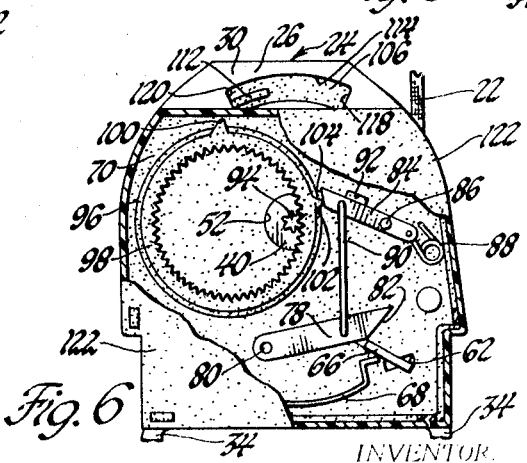
FIG. 6 is a view similar to FIG. 4 and showing a predetermined length of belt extended.
Figure 7:
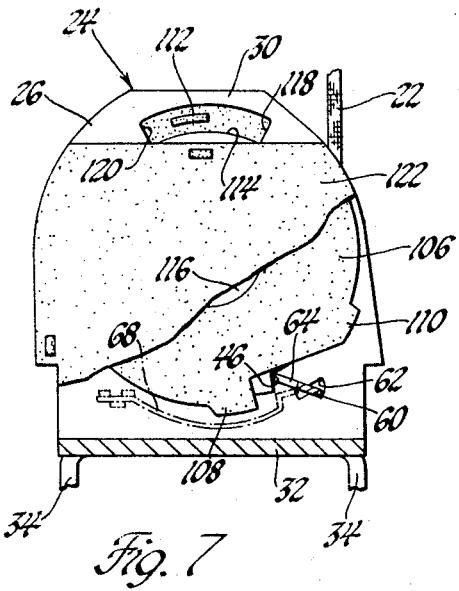
FIG. 7 is a view similar to FIG. 6 and showing a partial retraction of the belt after the belt has been extended beyond the predetermined length.
Figure 8:
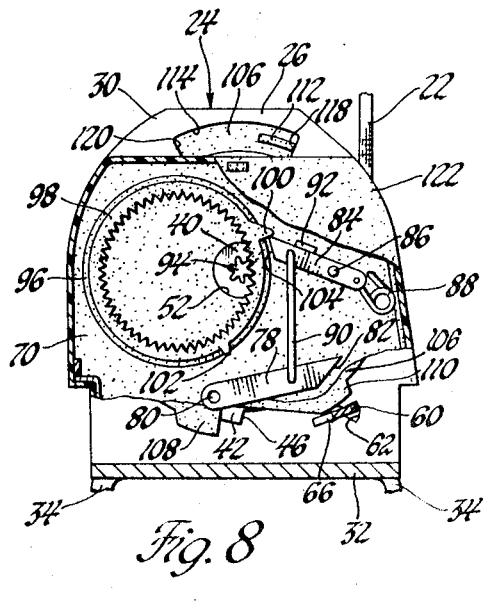
FIG. 8 is a view similar to FIG. 7 and showing continued retraction of the belt.

As previously mentioned, the retractor includes blocking means movable into and out of engagement with the pawl to thereby block and unblock movement of the pawl with respect to the ratchet plates. The blocking means includes a blocking member 78 pivoted at 80 to the plate 70. A chamfered foot 82 of member 78 is engageable with extension 66 opposite the spring 68 when the blocking member is in blocking position, as shown in FIGS. 4, 5 and 10, to thereby hold the extensions 64 out of engagement with the ratchet plates 42. When the blocking member 78 is in unblocking position, as shown in FIGS. 6, 7 and 8, the foot 82 does not engage the extension 66 of the pawl 60. The extensions 64 then engage the peripheries of the ratchet plates 42 under the action of spring 68 and engage the adjacent pair of shoulders 46 of the plates upon counterclockwise movement of the reel 44.

A control member 84 is pivoted at 86 to the plate 70 and an overcenter type coil torsion spring 88 extends between one end of the control member 84 and the plate 70 to selectively and alternately bias the member 84 clockwise and counterclockwise about the pivot 86. A rod link 90 pivotally interconnects the control member 84 and the blocking member 78. When the control member is in its one position shown in FIGS. 4 and 5, the blocking member is in blocking position and the spring 88 biases the control member counterclockwise about the pivot 86. No stop is, of course, needed for the control member since the engagement of the foot 82 of the blocking member with the extension 66 provides such a stop.

When the control member is in its other position shown in FIGS. 6 and 8, the blocking member is in unblocking position and the spring 88 biases the control member clockwise about the pivot 86. The engagement of the control member with a lateral tab 92 of the plate 70 provides a stop.

A spur gear 94 is formed integral with the end of the shaft 40 journaled in the end wall 30. The plate 70 includes an integral circular wall or flange 96 of very slight height and an integrally toothed ring gear 98 is journaled within this wall for rotation about an axis eccentric to the axis of the shaft 40. The internal teeth of the ring gear mesh with the teeth of the spur gear 94 so that upon rotation of the shaft 40, the ring gear 98 is rotated about its own axis.

The external periphery of the ring gear includes a first abutment 100 extending radially thereof and a second abutment 102 which also extends radially but to a lesser extent than the abutment 100.

When the ring gear is rotated clockwise, the engagement of the abutment 100 with the control member 84, as shown in FIGS. 4 and 10, moves the control member counterclockwise of the pivot 86 to its one position to locate the blocking member in blocking position. When the ring gear is rotated counterclockwise, the engagement of the abutment 102 with a chamfered foot 104 of the control member 84 will swing the control member clockwise of the pivot 86 to its other position shown in FIG. 6 to move the blocking member to unblocking position. The abutment 102 and the chamfered foot 104 are arranged to bypass each other when the control member 84 is in its other position as shown in FIG. 6.

A cam plate 106 fits between the ratchet plate 42 and the end wall 30 and includes a pair of abutments or shoulders 108 and 110, as shown in FIG. 3. The plate 106 also includes a an integral lateral tab 112 which extends outwardly through an arcuate slot 114 of predetermined extent in the end wall 30. A wavy-type spring washer 116 seats between the plate 106 and the wall 30, as shown in FIG. 2, to continually bias the plate 106 into frictional engagement with the ratchet plate 42. The engagement of the lateral tab 112 with either end wall 118 or 120 of the slot 114 locates the plate 106 against movement with the reel, as will be further described.

When the belt is in a fully retracted position as shown in FIGS. 2, 3, 4 and 10, the abutment 100 of ring gear 98 engages the control member 83 and the blocking member 78 is located in unblocking position. The engagement of the chamfered foot 82 of the blocking member with the extension 66 under the action of spring 88 rotates the pawl 60 counter clockwise within the openings 62 to maintain the extensions 64 out of engagement with the peripheries of the ratchet plates 42 against the action of spring 68.

The cam plate 106 has its lateral tab 112 engaging the wall 118 of slot 114 to locate shoulder 110, as shown in FIG. 3 in engagement with one of the extensions 64 to additionally hold the extensions 64 of pawl 60 out of engagement with the peripheries of the ratchet plates 42. Reel 44 is thus free to rotate in a counterclockwise or belt-extending direction.

When a seated occupant graphs of the D-ring and pulls the belt 22 outwardly of the retractor 24, the reel 44 rotates counterclockwise, as viewed in FIGS. 3, 4, 5, 6 and 10 of the drawings against the action of spring 56. Upon a few degrees of counterclockwise movement, the shoulder 110 moves out of engagement with the one extension 64 of pawl 60 as the tab 112 of the cam plate 106 moves away from the wall 118 and toward the wall 120. Upon further counterclockwise movement, tab 112 engages the wall 120 as shown in FIG. 5 so that shoulder 108 now engages the extension 74. During this movement of the cam plate, the ring gear 98 rotates in a counterclockwise direction and the blocking member remains in unblocking position as abutment 100 moves counterclockwise away from the foot 104 of control member 84 and abutment 102 moves counterclockwise toward the foot 104 of the control member.

When the predetermined length of belt has been extended abutment 102 engages foot 104, as shown in FIG. 6, and swings the control member 84 clockwise of the pivot 86 from its FIG. 5 position to its FIG. 6 position in engagement with tab 92 as spring 88 goes over center. Link 90 thereupon moves the blocking member to unblocking position. However the extensions 64 of pawl 60 remain out of engagement with the peripheries of the ratchet plates 42 since it will be remembered that the abutment 108 of plate 106 engages one extension 64. Thus, after a predetermined length of belt has been extended, only the cam plate 106 blocks engagement of the extensions 64 of the pawl with the ratchet plates 42.

Normally, the occupant will further extend the belt 22 around himself to engage the D-ring of this belt with the buckle 20 of belt 16 and form the lap belt assembly. During this further movement of belt 22, only ring gear 49 rotates and abutment 102 bypasses foot 104 and moves counterclockwise thereof. After belts 16 and 22 have been engaged, the occupant releases the belt 22 and the spring 56 rotates reel 44 in a clockwise or belt-retracting direction until the belt assembly snugly engages the occupant. As the reel rotates in a clockwise direction, the cam plate 106 moves with the reel from its FIG. 6 position to either its FIG. 3 position or a position intermediate these positions, depending on the arc of movement of the reel necessary to snugly engage the belt assembly with the occupant. Thus, either shoulder 100 of the cam plate 106 will engage the pawl extension 64, as shown in FIG. 3, or the pawl extension 64 will be located between shoulders 108 and 110. If the latter occurs, spring 68 moves the pawl extensions 64 into engagement with the cam surfaces 46 of each ratchet plate. Thereafter the occupant slightly retracts the belt 22 to pull the belt assembly tight about him as the pawl extensions ratchet over the shoulders 46 of the ratchet plates counterclockwise thereof. Cam plate 106 either remains in its position shown in FIG. 3 or moves to this position.

The occupant then extends the belt 22 so that the pawl extensions 64 engage the shoulders 46 of the ratchet plates clockwise thereof to lock the belt 22 against further extension. During this movement, the cam plate 106 moves slightly counterclockwise to its position shown in FIG. 7 wherein tab 112 is located between walls 118 and 120.

When the occupant releases the buckle 20 from the D-ring, the spring 56 rotates the reel 44 in a clockwise or belt-retracting direction. The cam plate 106 moves with the reel 44 from its position shown in FIG. 7 to its position shown in FIG. 8 so that tab 112 engages the wall 118 of slot 114 and shoulder 110 engages the one extension 64 of the pawl to move the pawl out of engagement with the ratchet plates. The ring gear 98 rotates in a clockwise direction and abutment 102 bypasses foot 104 and moves clockwise thereof. Immediately before the belt 22 is fully retracted, abutment 100 engages the foot 104 of the control member 84, as shown in FIG. 8, and immediately thereafter moves the control member 84 from its FIG. 8 position to its FIG. 4 position to again move the blocking member 78 to blocking position in engagement with the pawl extension 66 and cooperate with the shoulder 110 in holding the pawl extension 64 out of engagement with the ratchet members 42.

A suitable flanged cover 122 is provided for the plate 70 and may be secured thereto by hot staking plurality of integral lateral tabs of the plate to the cover as shown in FIG. 10. The conventional cover 124, FIG. 1, covers the housing 24 and includes a slot for passage of belt 22 therethrough. The conventional enlarged sewn portion of the belt attaching the D-ring thereto engages the cover 124 adjacent the slot therein to fix the fully retracted position of belt 22.

Thus, this invention provides an improved seatbelt retractor.

I claim:

1. In a retractor having support means, reel means rotatably mounted on the support means, belt means mounted on the reel means for extension and retraction relative thereto upon rotation of the reel means in extending and retracting directions relative to the support means, means biasing the reel means in a retracting direction to retract the belt means and stop means, normally operative to hold the reel means against movement in an extending direction and to permit movement in a retracting direction by said biasing means, the combination comprising, a blocking member mounted on the support means for movement between a blocking position wherein the blocking member blocks the stop means and an unblocking position wherein the blocking member permits operation of the stop means, means releasably holding the blocking member selectively and alternately in blocking or unblocking position, moving means operable to move the blocking member between blocking and unblocking positions, and reel-driven means intermittently operatively connected to the moving means during movement of the reel means for actuating the moving means to move the blocking member to unblocking position upon movement of the reel means in an extending direction and to move the blocking member to blocking position upon movement of the reel means in a retracting direction.

2. In a retractor having support means reel means, reel means rotatably mounted on the support means, belt means mounted on the reel means for extension and retraction relative thereto upon rotation of the reel means in extending and retracting directions relative to the support means, means biasing the reel means in a retracting direction to retract the belt means and stop means, normally operative to hold the reel means against the movement in an extending direction and to permit movement in a retracting direction by said biasing means, the combination comprising, a blocking member mounted on the support means for movement between a blocking position wherein the blocking member blocks the stop means and an unblocking position wherein the blocking member permits operation of the stop means, a control member mounted on the support means for movement between first and second positions relative thereto, means operably connecting the control member to the blocking member to move the blocking member between blocking and unblocking positions upon movement of the control member between first and second positions, and reel-driven means intermittently operatively connected to the control member during movement of the reel means for actuating the control member to move the blocking member to unblocking position upon movement of the control member to the first position and movement of the reel means in an extending direction, and to move the blocking member to blocking position upon movement of the control member to the second position and movement of the reel means in a retracting direction.

3. In a retractor having support means, reel means rotatably mounted on the support means, belt means mounted on the reel means for extension and retraction relative thereto upon rotation of the reel means in extending and retracting directions relative to the support means, means biasing the reel means in a retracting direction to retract the belt means and stop means, normally operative to hold the reel means against movement in an extending direction and to permit movement in a retracting direction by said biasing means, the combination comprising, a blocking member pivoted to the support means for swinging movement between a blocking position wherein the blocking member blocks the stop means and an unblocking position wherein the blocking member permits operation of the stop means, a control member pivoted to the support means for swinging movement between first and second positions relative thereto, a link pivotally interconnecting the blocking member and control member to move the blocking member between blocking and unblocking positions upon movement of the control member between first and second positions, and a reel-driven annular member rotatably mounted on the support means and intermittently operatively connected to the control member having spaced peripheral means during movement of the reel means for actuating the control member to move the blocking member to unblocking position upon movement of the control member to the first position and movement of the reel means in an extending direction, and to move the blocking member to blocking position upon movement of the control member to the second position and movement of the reel means in a retracting direction.

4. In a retractor having support means, reel means rotatably mounted on the support means, belt means mounted on the reel means for extension and retraction relative thereto upon rotation of the reel means in extending and retracting directions relative to the support means, means biasing the reel means in a retracting direction to retract the belt means and stop means normally operative to hold the reel means against movement in an extending direction and to permit movement in a retracting direction by said biasing means, the combination comprising, first blocking means for the stop means moveable by the reel means to a predetermined blocking position with respect to the stop means upon rotation of the reel means in an extending direction through a predetermined arc, second blocking means for the stop means mounted on the support means for movement between blocking and unblocking positions with respect to the stop means, means locating the second blocking means in blocking position during movement of the reel means through the predetermined arc, cooperating means on the reel means and the second blocking means intermittently connected upon movement of the reel means through an arc greater than the predetermined arc for moving the second blocking means to unblocking position, and means relocating the second blocking means in blocking position during movement of the reel means in a retracting direction.

5. The combination recited in claim 3 wherein the reel-driven annular member includes an internally toothed ring gear driven by a reel-driven gear and having a pair of peripherally spaced radially extending abutments selectively and alternately engageable with the control member during movement of the reel means.

6. The combination recited in claim 3 wherein the reel-driven annular member includes a ring gear driven by the reel means and having a pair of peripherally spaced radially extending abutments of different extent, the abutment of lesser radial extent engaging the control member to move the blocking member to unblocking position and the abutment of greater radial extent engaging the control member to move the blocking member to blocking position, and cooperating means on the control member and abutment of lesser radial extent permitting the abutment of lesser radial extent and control member to bypass each other after engagement thereof.

7. The combination recited in claim 3 including overcenter spring means interconnected between the control member and support means and selectively and alternately biasing the control member to either the first position or the second position thereof, and stop means engageable by the control member upon movement thereof to the first position to locate the control member against the action of the overcenter spring means, engagement of the blocking member with the pawl providing a stop locating the control member in the second position thereof against the action of the overcenter spring means.

PO-1050
(5/69)

UNITED STATES PATENT OFFICE
CERTIFICATE OF CORRECTION

Patent No. __3,598,336__          Dated __August 10, 1971__

Inventor(s) __George Edward Frost__

It is certified that error appears in the above-identified patent and that said Letters Patent are hereby corrected as shown below:

Column 1, line 47, "an" should read -- and --.

Column 2, line 61, after "14" insert a period (.).
          line 66, after "24" delete "a".

Column 3, line 22, "46" should read -- 56 --.

Column 4, line 40, after "includes" delete "a".
          line 51, "83" should read -- 84 --.
          line 64, "graphs" should read -- grasps --.
          line 74, "74" should read -- 64 --.

Column 5, line 21, "49" should read -- 98 --.
          line 31, "100" should read -- 110 --.
          line 35, after "cam surfaces" insert -- 48 of the ratchet plates between a pair of successive shoulders --.
          line 67, "The" should read -- A --.

Column 6, line 7, delete the comma (,).
          line 31, delete the comma (,).
          line 60, delete the comma (,).

Signed and sealed this 29th day of February 1972.

(SEAL)
Attest:

EDWARD M. FLETCHER, JR.          ROBERT GOTTSCHALK
Attesting Officer                Commissioner of Patents